Jan. 31, 1967     J. A. BURKE     3,301,271
ANGLECOCK
Filed Aug. 3, 1964     4 Sheets-Sheet 1

INVENTOR.
JOHN A. BURKE
BY Sanford Schnurmacher
ATTORNEY.

Jan. 31, 1967  J. A. BURKE  3,301,271
ANGLECOCK
Filed Aug. 3, 1964  4 Sheets-Sheet 2

INVENTOR.
JOHN A. BURKE
BY
Sanford Schnurmacher
ATTORNEY.

Jan. 31, 1967  J. A. BURKE  3,301,271
ANGLECOCK
Filed Aug. 3, 1964  4 Sheets-Sheet 3
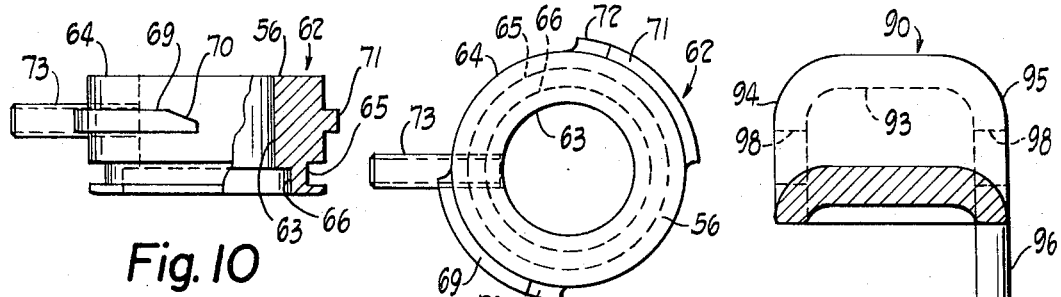
Fig. 10  Fig. 11  Fig. 14
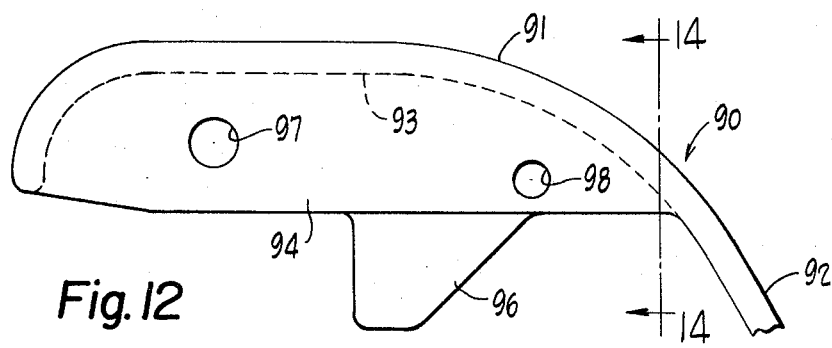
Fig. 12
Fig. 13
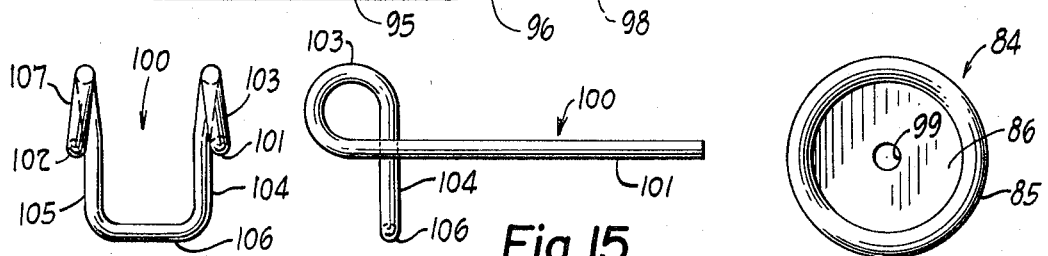
Fig. 16  Fig. 15  Fig. 17
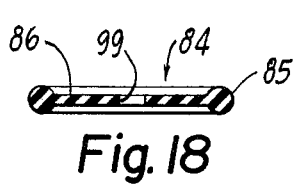
Fig. 18
INVENTOR.
JOHN A. BURKE
BY
Sanford Schnurmacher
ATTORNEY.

Jan. 31, 1967 J. A. BURKE 3,301,271
ANGLECOCK

Filed Aug. 3, 1964 4 Sheets-Sheet 4

INVENTOR.
JOHN A. BURKE
BY
Sanford Schnurmacher
ATTORNEY a common pipe thread, and air sealed by a separate compression gland gasket.

These, and other objects of the invention will become apparent from a reading of the following specification and claims, together with the accompanying drawing, wherein:

FIGURE 10 is a front elevation of the bonnet, partly in section;

FIGURE 11 is a top plan view of the same;

FIGURE 12 is a side elevation of the handle in its unmounted condition;

FIGURE 13 is a bottom plan view of the same;

FIGURE 14 is a right end view of the handle taken along the line and in the direction of the arrows 14—14 of FIGURE 12;

FIGURE 15 is a side elevation of the handle spring;

FIGURE 16 is a left end view of the same;

FIGURE 17 is a front elevation of the rubber sealing torus;

FIGURE 18 is a cross sectional view of the same;

Figure 1:
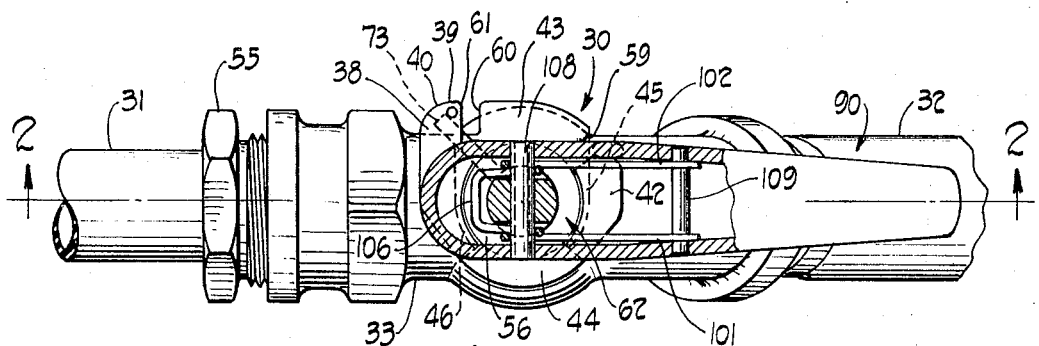
FIGURE 1 is a top plan view, partly in section, of the angle cock that is the subject of this invention.
Figure 2:
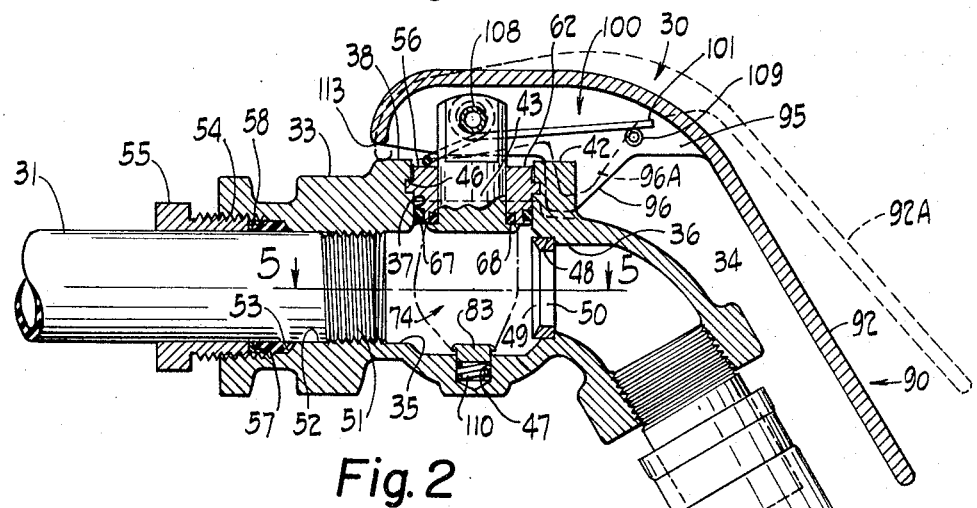
FIGURE 2 is a vertical sectional view taken along the line and in the direction of the arrows 2—2 of FIGURE 1.
Figures 3, 4:
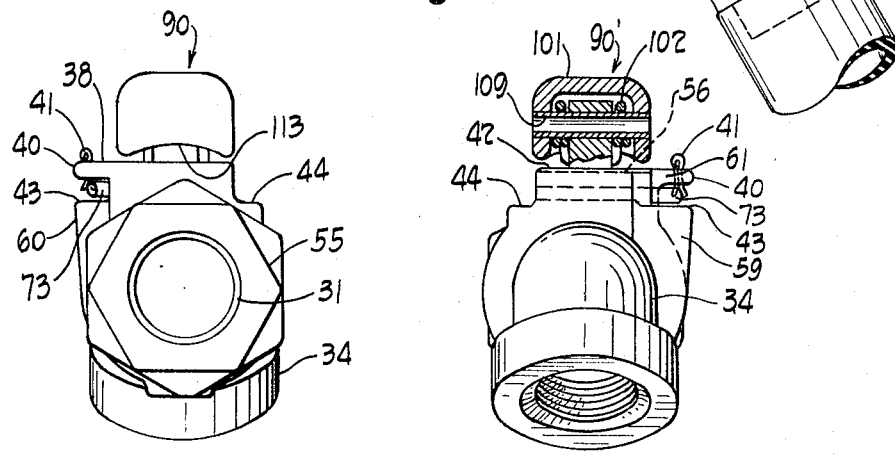
FIGURE 3 is a left end view of the unmounted angle cock.
FIGURE 4 is a right end view of the same.

Referring more particularly to the drawing there is seen in FIGURES 1 and 2 thereof the angle cock that is the subject of this invention, broadly indicated by reference numeral 30.

Reference numeral 33 indicates a valve casing, or body, provided at its ends with axially aligned inlet and outlet ducts 35 and 36, respectively.

Within the casing there is provided a rotatable "C" valve 74 with a yoke 79 having an offset valve disc 80 positioned thereon in a plane parallel to the axis of rotation of the valve and perpendicular to the axis of the inlet and outlet ducts 35 and 36. The disc 80 being rotatable 90° to a full open position, wherein it is located laterally of the ducts, to provide for unobstructed flow through the valve casing, as is seen most clearly in FIGURE 5.

The body outlet duct 36 has a nozzle 34 formed at its outer end which is internally threaded to receive the fitting at the end of the coupling hose 32.

The outlet duct 36 is counterbored, at 48, to receive a valve seat 50 in a pressed fit.

The seat 50 is in the form of a stainless steel annulus, or ring, concentric with the center-line of the duct 36.

The active end 49 of the seat, that is, the end which is contacted by the valve 74 in seating the valve, is a plane surface, conical in shape.

The inlet 35 is threaded at 51 to receive the threaded end of the brake pipe nipple 31, in a mechanical fit.

The duct 35 also has a smooth counter-bore 52 and a second, threaded, counter-bore 54 of larger diameter, at its outer end. The junction between the two counterbores being conical in shape to define a seat 53, against which a compression gland gasket 57 is seated.

The gasket 57 is backed up by a metal expansion ring against which an expansion nut 55 thready mounted in the bore 54, may be tightened to expand the gland 58 into an air-tight seal with the brake pipe 31.

The threaded end 51 of the brake pipe may have the form of an ordinary pipe thread, since its only purpose is to create a mechanical joint between the body 30 and the brake pipe 31. The gland 58 acts to create the gas-tight seal, as seen in FIGURE 2. Thus, the angle cock cannot be accidentally pulled off the end of the pipe 31, as might be the case where only a compression gland is used.

Figure 7:
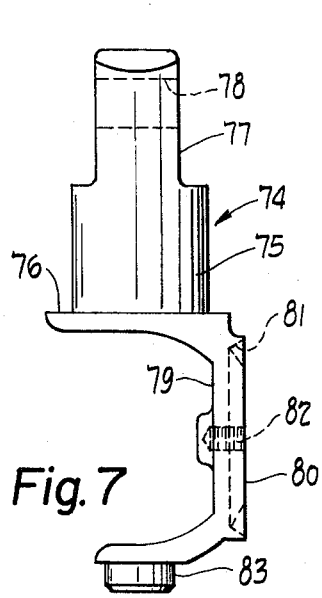
FIGURE 7 is a side elevation of the C plug, in its dismantled condition.
Figure 8:
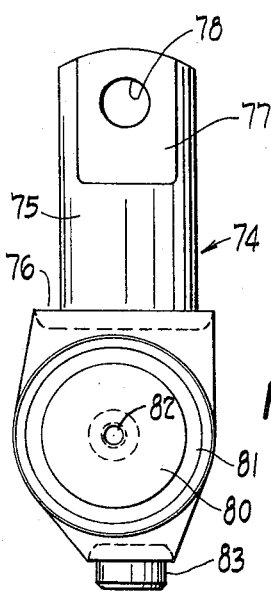
FIGURE 8 is a front elevation of the same.
Figure 9:
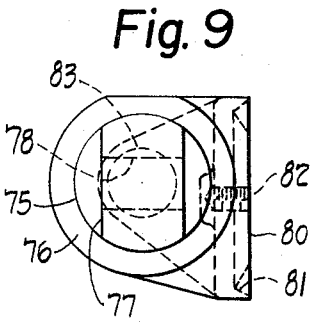
FIGURE 9 is a top plan view of the same.

Reference numeral 74 indicates the C valve unit as a whole, whose construction is most clearly shown in FIGURES 7, 8 and 9. The valve unit 74 has a C shaped center section, or yoke, 79 having an upwardly extending bearing shaft 75 with a circular shoulder 76 at its base, and an upwardly extending stem 77 upon which the handle 90 is mounted through a roll pin 108 which is seated in cross bore 78, as seen in FIGURES 1 and 2. A second bearing shaft, or stud, 83 is located on the lower leg of the yoke 79 in axial alignment with the bearing shaft 75.

Reference numeral 80 indicates a circular disc surface on the yoke 79, faced away from the axis of rotation of the shafts 75 and 83 and spaced outwardly therefrom in a plane parallel thereto.

The center of the disc 80 is eccentrically offset 0.10" from the center of rotation of the stud 73 and the shaft 75, as seen in FIGURES 8 and 9.

The disc 80 has a circular groove 81 at the circumferential edge thereof and a threaded hole 82 centered therein.

Reference numeral 84 indicates a valve sealing gasket in the form of a webbed torus molded from a synthetic rubber, such as so-called "Buna 'N'," characterized by its long life and imperviousness to oil and grease. The torus 84 has a rim 85 of circular cross-section, with a solid web 86 centered therein, all molded as a single unit. The web has a hole 99 centered therein for the passage of a mounting screw 89.

Figure 5:
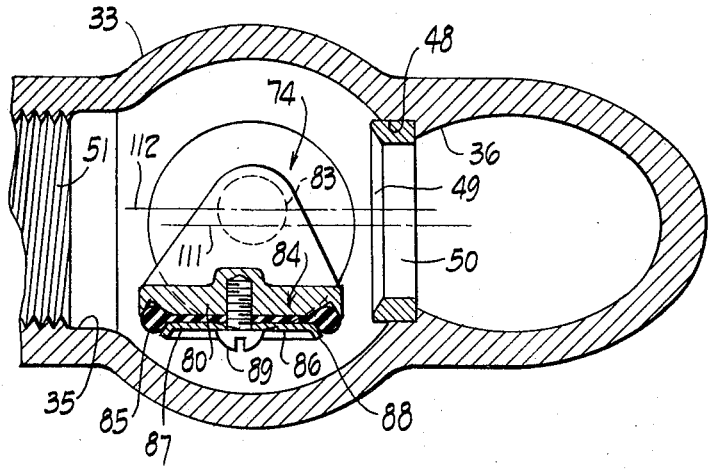
FIGURE 5 is a horizontal sectional view taken along the line and in the direction of the arrows 5—5 of FIGURE 2.
Figure 6:
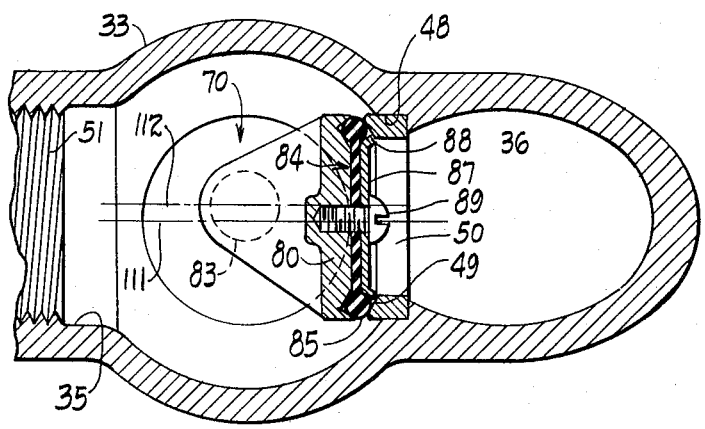
FIGURE 6 is a sectional view similar to that of FIGURE 5, but showing the valve in its closed position.

The torus 84 is mounted on the disc 80 with the rim 85 seated in the groove 81. A brass retainer disc 87, having a rim 88 of a diameter to fit against the torus rim 85, as seen most clearly in FIGURES 5 and 6, is seated on top of the torus web 86 and held in place by a headed screw 89 which passes through the web hole 99 and is anchored in the threaded bore 82 of the yoke disc 80. The so mounted torus 84 is thus held in place, flat against the valve disc surface 80, with its sealing rim 85 firmly backed up by the groove 81 thereof.

The body 33 has an upstanding neck portion with a vertical bore 37 therethrough. The body also has a blind bearing socket 47 in the floor thereof which is aligned with the axis of the bore 37. The axis 112 of the bearing bores 37 and 47 is offset laterally 0.10" from the axial center-line 111 of the body and valve seat 49, as seen most clearly in FIGURES 5 and 6.

Figure 19:
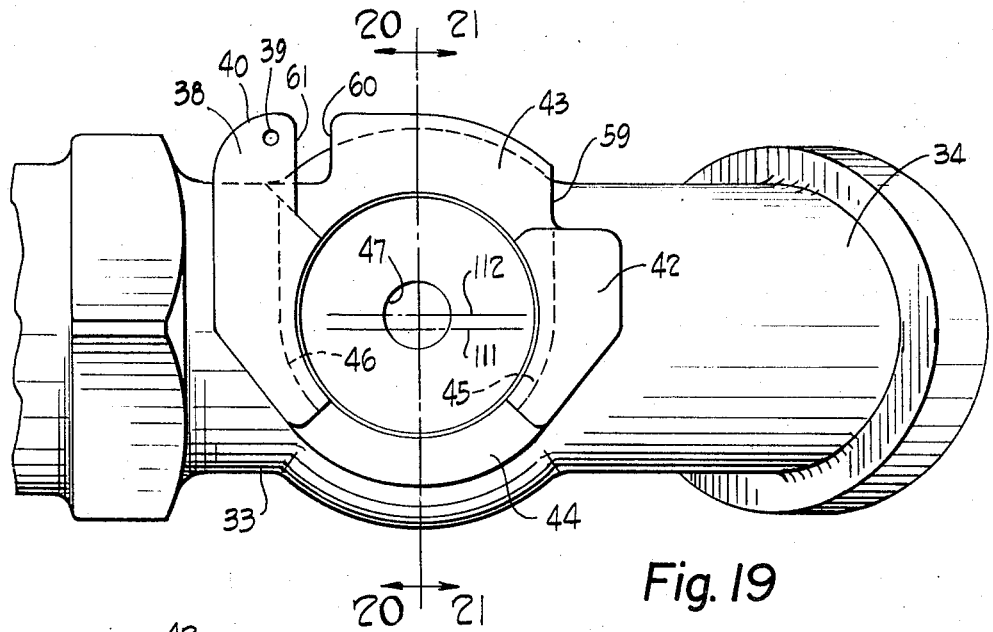
FIGURE 19 is a top plan view of the valve body.

The body neck has two opposed curved ledges 43 and 44, lying in the same plane. The ledge 43 has two termini 59 and 60 cut at approximately 90° to the peripheral edge thereof, as seen most clearly in FIGURE 19. The neck also has two opposed handle stops 38 and 42 positioned between the ledges 43 and 44, and extending upwardly to a plane above that of the ledges.

Figures 20, 21:
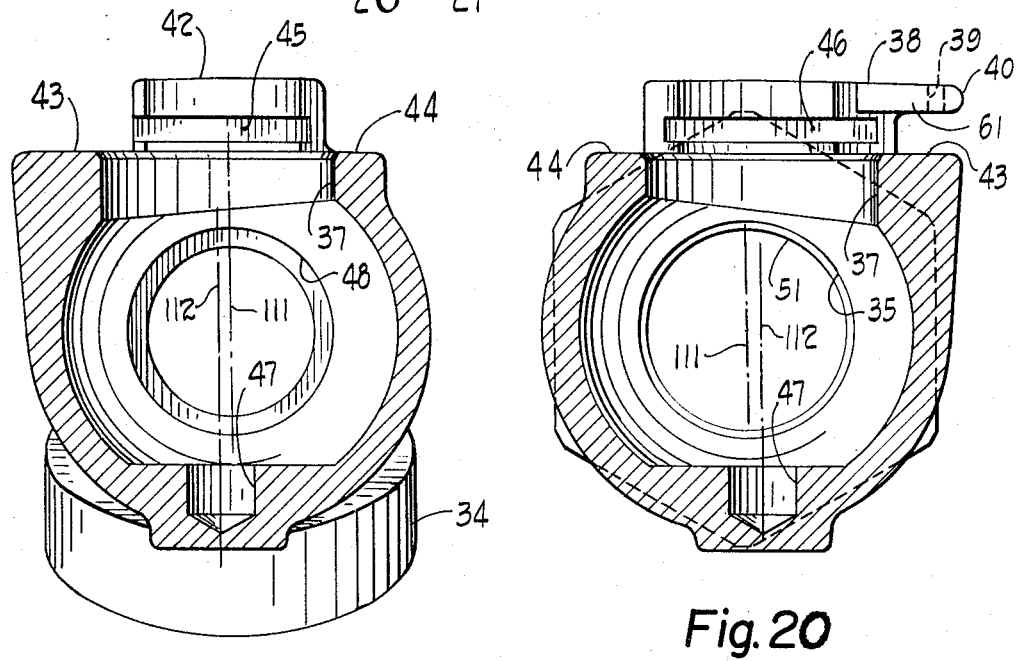
FIGURE 20 is a cross sectional view taken along the line and in the direction of the arrows 20—20 of FIGURE 19; and, FIGURE 21 is a cross sectional view taken along the line and in the direction of the arrows 21—21 of FIGURE 19.

Reference numerals 45 and 46 indicate two opposed slots, or tracks, cut in the face of the neck bore between the ledges, in a plane immediately above that of the ledges, as is seen in FIGURES 20 and 21.

The handle stop 38 has a laterally extending ear 40 spaced both horizontally and vertically from the terminus 60 of the ledge 43, with a cotter-pin receiving bore 39 at its outer end.

Reference numeral 62 indicates a bonnet adapted to be seated in the neck bore 37. The bonnet 62 is cylindrical in shape and of a diameter to snuggly fit in the neck bore 37.

The bonnet has two laterally extending fins, or keys 69 and 71, located on its peripheral face 64, of a width to slidably fit and interlock with the neck slots 45 and 46. The keys have tapered entering ends 70 and 72, respectively, as seen in FIGURE 11.

The bonnet has a bearing bore 63 of a diameter to receive and journal the shaft 75 of the valve unit 74 therein. The bore 63 is counter-bored at 66, at its lower end, to receive an O-ring gasket 68 therein. Reference numeral 65 indicates a groove in the peripheral face of the bonnet, below the keys 69 and 71, adapted to receive a second O-ring gasket 67. Reference numeral 73 indicates a radially extending pin mounted in the bonnet body at the end of the key 69, as seen in FIGURE 11.

Reference numeral 90 indicates a valve actuating handle adapted to be pivotally mounted on the stem 77 of the valve unit 74.

The handle has a body portion with a lever arm 92 extending downward at an angle of approximately 60°. The body portion has two dependent spaced and parallel sides 94 and 95 and an end wall 113 which together define a hollow cap 93 adapted to fit over the top of the valve stem 71.

The side walls have two sets of aligned holes 97 and 98 therethrough. A roll pin 109 is mounted between the walls 94 and 95 in the aligned holes 98.

Side wall 95 has a dependent triangular finger 96 of a width to snugly fit between the opposed faces 60 and 61 of the ledge 43 and the ear 40, as to be described hereinafter.

Reference numeral 100 indicates a substantially U-shaped spring, shown in enlarged form in FIGURES 15 and 16.

The spring is formed from a single length of spring wire bent to provide a base portion 106 with two spaced and parallel short arms 104 and 105 which are, in turn, bent upon themselves to form two opposed loop portions 103 and 107 which then extend outwardly to provide two parallel long arms 101 and 102 which are normally at 90° to the short arms when the spring 100 is in its un-stressed condition illustrated in FIGURE 15.

In assembling the angle cock 30 the sealing gasket torus 84 is mounted on the valve disc 80, as described hereinabove. The O-ring gaskets 67 and 68 are mounted in their respective grooves in the bonnet, and the valve unit 74 is mounted in the bonnet with its shaft 75 journaled in the bonnet bore 63. The spring 100 is placed on the bonnet with its base and 106 resting on the bonnet top 56 and its loops 103 and 107 positioned on opposite sides of the valve stem 77 in alignment with the bore 78, thereof. The handle body 91 is then mounted on the stem 77 by first slipping the cap pin 109 under the long arms 101 and 102 of the spring and then aligning the side wall holes 97 with both the spring loops 103 and 107 and the stem bore 78. A second roll pin 108 is then mounted through the so aligned bore 78, thus causing the handle 90 to be pivotally mounted on the valve stem 77 for limited back and forth movement.

The spring arms 101 and 102, which press down on the pin 109, normally act to pivot the handle downward to a first position. The handle 90 may be tilted upward by lifting the lever arm 92, against the biasing action of the spring, until the end wall 113 contacts the top of handle stop 38, as seen in FIGURE 2, in which the raised, or second, position of the lever arm is indicated by reference numeral 92a.

The so mounted bonnet is swivelled on the shaft 75 until its locating pin 73 abuts the side face of the triangular handle finger 96. The valve unit 74 is then inserted through the body neck bore 37, and the lower bearing stud 83 seated in the bearing socket 47 on the floor of the body 33, on top of an expansion spring 110 located therein. The bonnet is pressed down into the neck bore 37, on the shaft 75, until the tapered ends 70 and 72 of the keys 69 and 71, respectively, are aligned with the slots 46 and 45 of the bore 37. The handle lever arm 92 is tilted upward to its second position 92a wherein the lower edge of the finger 96 will clear the top surface of the ledge 43. The handle 90 is then rotated counter-clockwise, with its dependent finger bearing against the bonnet pin 73, until the pin, which passes over and above the ledge 43, is moved under the ear 40 and beyond the cotter-pin hole 39. A cotter-pin 41 is inserted and locked behind the pin 73. This locks the bonnet in place, and at the same time the valve unit is also properly positioned in the body 33, all without the use of any tools.

The expansion spring 110 acts to bias the valve unit shoulder 76 against the lower face of the bonnet and the inner bonnet O-ring gasket 68, which is compressed to provide a gas-tight seal between the shaft 75 and the bonnet bore 63. At the same time, as study of FIGURE 2 will also disclose, the O-ring gasket 67 in bonnet groove 65 provides a gas-tight seal between the bonnet and the neck bore 37. Thus all air leakage to the atmosphere is prevented.

The raised handle lever 92a is then turned clockwise to its first position, with the finger 96 against the handle stop 42, parallel to the axis of the body, and released over the nozzle 34. The spring arms 101 and 102 will cause the handle to tilt downward, in which position the finger 96 will extend below the plane of the ledge 43 and lie against its end terminus 59.

The finger 96 thus cannot move in either direction and holds the handle 90 and valve unit 74 locked in their open position, as seen in FIGURES 1 and 2. As seen in FIGURE 5, when the valve unit 74 is in its open position the valve disc 80 is to one side, and clear of both the inlet and outlet bores 35 and 36, allowing free flow of air through the angle cock 30.

The spring 100 exerts a constant biasing pressure on the handle pin 109 which holds the handle in its first position no matter how extreme the vibration caused by the movement of the car on which the angle cock is mounted, thus insuring against accidental closing of the valve, with resultant braking failure.

To close the angle cock the handle lever 92 is tilted upward to its second position 92a, as shown in FIGURE 2, whereat the finger 94 is raised, to clear the ledge 34, but prevented from rising above the first handle stop 42 and ear 40 by the contact of the handle body end wall 113 with the top surface of the second handle stop 38.

The handle 90 is then rotated counter-clockwise 90° until its finger travels beyond the terminus 60 of ledge 43 and strikes the end face 61 of ear 40. With the handle in this position the valve torus 84 is seated against the valve seat 49, and the angle cock is closed, as seen in FIGURE 6.

The so located handle is pressed downward to its first position, whereat the finger 96, which has slightly tapered sides, is wedged between the terminus 60 and stop 61 and locked firmly against side movement. At the same time the biasing spring 100 acts to further assure immobility of the handle under conditions of extreme vibration. Thus, by moving the handle through an arc of 90° in either direction, full opening or closing of the angle cock is assured; there being no possibility of the cock being left only partly open or closed.

It will be noted from a study of FIGURES 5 and 6 that the center of rotation 112 of the valve unit 74 on its stud 83 is offset 0.10" from the center-line 111 of the valve seat 49, and that the center of the torus 84 is similarly offset 0.10", in the opposite direction from the center of rotation 112 of the stud 83, as seen in FIGURE 8, and lies directly on the center-line 111 of the valve seat 49 when the valve unit is in its closed position, as seen in FIGURE 6.

This relation of the parts provides an eccentric motion in the valve disc and its supported sealing torus 84 that brings the torus 84 into contact with the cock seat 49 at the moment it becomes centered against the seat 49, but not before.

There is no dragging or sliding action of the torus 84 across the seat 49 to cause wear, scoring, or tearing.

Furthermore, the journal fit of the valve unit stud 83 in the body bearing socket 47 is made intentionally loose so that the torus 84 need not be tightly fitted, mechanically, against the valve seat 49 as it is lined up therewith. There may be a few thousandths of an inch clearance.

The valve unit 74 with its disc 80 and supported torus 84 acts much as a poppet or check valve, when air pressure builds up to operating level in the brake pipe, behind the disc 80. The valve unit is shifted toward the seat 49 and the torus 84 pressed into firm sealed engagement therewith, as seen in FIGURE 6. This loose fit between the stud 83 and socket 47 makes for easy assembly of the valve unit 74 in the body 33, as well as further reducing any possibility of frictional drag of the torus face across the valve seat 49.

When, after a long period of time, the angle cock may start to leak, it is usually due to failure of the rubber torus sealing gasket 84, since the valve seat ring 50, being made of stainless steel, is not likely to show wear.

To replace the gasket 84 it is only necessary to have the handle lever arm 92 in its open position, as seen in FIGURE 1.

The cotter pin 41 is removed, and the bonnet pin 73 rotated clockwise until it bears against the side face of the handle finger 96. This rotates the bonnet and moves the keys 69 and 71 out of the body neck slots 45 and 46. The bonnet 62 and its attached valve unit 74 are free to be lifted out of the body 33 by pulling directly upward on the handle 90. A new torus sealing gasket 84 can now be easily mounted on the disc 80 to replace the worn one.

If the O-ring gaskets 67 and 68 are worn they may be easily replaced by stretching them and pulling them over the disc 80, without dismounting the handle 90.

The unit is then reinserted in the body; the bonnet keys 69 and 71 lined up with the neck slots 45 and 46; and the handle lever arm 92 raised and rotated counter-clockwise, with the handle finger 96 bearing against the bonnet pin 73, to move the pin under the ear 40, beyond the cotter pin hole 39. The cotter-pin is then replaced, locking the pin 73 and its bonnet in place in the body 33. The repair is now completed.

It will be noted that the angle cock body 33 remained mounted on the car brake pipe all the time, and that no tools were required to dismantle or reassemble the parts.

Thus, an unskilled workman can repair my angle cocks right in the yard by merely carrying around a handful or two of my rubber sealing gaskets 84 and O-rings 67 and 68. No costly machining operations and the holding of cars out of service is involved, as is the case with conventional taper-plug angle cocks.

It will now be clear that there has been provided a device which accomplishes the objectives heretofore set forth.

While the invention has been disclosed in its preferred form, it is to be understood that the specific embodiment thereof as described and illustrated herein is not to be considered in a limited sense, as there may be other forms or modifications of the invention which should also be construed to come within the scope of the appended claims.

I claim:

1. A railroad car angle cock, comprising in combination, a valve casing; an inlet duct and an outlet duct for the casing, said casing and ducts being co-axial; a valve seat disposed at the inner end of said outlet duct, concentric with the duct; fixed bearings disposed opposite each other in the wall of said casing, aligned at 90° to the axes of the casing and ducts; a rotatable C valve unit for said valve seat, journaled in said fixed bearings; said valve unit having a flat disc offset both laterally and transversely of its axis of rotation, faced away therefrom and parallel thereto, to provide unobstructed passage for the flow of fluid through the casing when the valve unit is in its open position; a yieldable webbed torus mounted on the outer face of the disc, engageable in sealing contact with the outlet duct seat, when the valve unit is in its closed position; and, valve operating means for rotating said valve unit 90° in said fixed bearings to seat and unseat the valve unit, said bearings being so disposed relative to the axes of said ducts, casing, and valve seat, that in rotating the valve unit, to seat and unseat the same, the valve unit disc must move about a fixed axis which is transverse of said valve disc center-line and eccentric to the valve seat, to provide for direct non-dragging engagement between the disc torus and seat as the valve unit approaches its fully closed position, wherein the center-line of the disc torus and valve seat coincide.

2. A railroad car angle cock, comprising in combination, a valve casing; an inlet duct and an outlet duct for the casing, said casing and ducts being co-axial; a valve seat disposed at the inner end of said outlet duct, concentric with the duct; the casing having a fixed bearing in its bottom wall and a neck in its top wall with a vertical bore therethrough, aligned with the bottom wall bearing, and adapted to receive a closure bonnet therein in a bayonet fit, the center-line of the fixed bearing and neck bore being eccentric to the longitudinal axes of the valve casing, valve ducts and valve seat; a cylindrical closure bonnet, having a bearing bore therethrough, removably mounted in said neck bore bayonet seat; a rotatable C valve unit, for said valve seat, having a shaft adapted to be journaled through said bonnet bearing bore, at its upper end, and in the fixed bottom wall bearing at its lower end; an operating handle mounted on the upper end of the shaft, above the bonnet; the bonnet being rotatable 90° on the C valve unit shaft, between a first position, wherein it and its associated C valve unit may be freely inserted in, or withdrawn through, the casing neck bore, and, a second position, wherein it is immovably seated and locked in the neck bore; the bonnet also having a laterally extending pin mounted in the periphery thereof; means on the handle engageable with the bonnet pin, whereby, upon rotation of the handle, the bonnet may be rotated from its first position to its second position; the handle being free to move through a 90° arc, either clockwise or counter-clockwise, when the bonnet is in its second position, to rotate the C valve unit in said bearings to seat and unseat the C valve unit.

3. A railroad car angle cock, comprising in combination, a valve casing; an inlet duct and an outlet duct for the casing, said casing and ducts being co-axial; a valve seat disposed at the inner end of said outlet duct, concentric with the duct; the casing also having a fixed bearing socket in its bottom wall, and a neck in its top wall aligned therewith, the neck having a vertical bore therethrough adapted to seat a closure bonnet therein in a bayonet fit; a C valve unit, comprising, a C-shaped yoke having a dependent bearing stud on its lower leg and an upstanding stem on its upper leg, the stem having a shaft portion axially aligned with the stud; the C valve unit yoke having a flat disc surface offset both laterally and transversely of the common axis of the stem shaft and stud, faced away therefrom and parallel thereto; a yieldable webbed torus removably mounted on the face of the disc, and engageable in sealing contact with the outlet duct valve seat when the C valve unit is in its closed position; an operating handle mounted on top of the step; a cylindrical bonnet mounted on the shaft, below the handle, and serving as a fixed bearing block for the shaft; the bonnet being adapted to be mounted in the casing neck bore through a bayonet fit, with the valve stud journaled in the casing bearing socket, the bonnet being rotatable 90° on the C valve unit shaft, between a first position, wherein it and its associated C valve unit may be freely inserted in, or withdrawn through, the casing neck bore, and, a second position, wherein it is immovably seated and locked in the neck bore; the bonnet also having a laterally extending pin mounted in the periphery thereof; means on the handle engageable with the bonnet pin, whereby, upon rotation of the handle, the bonnet may be rotated from its first position to its second position; the handle being free to move through a 90° arc, either clockwise or counter-clockwise, when the bonnet is in its second position, to rotate the C valve unit in said fixed bearings to seat and unseat the C valve unit, said bearings being so disposed relative to the axes of said ducts, casing, and valve seat, that in rotating the C valve unit, to seat and unseat same, the C valve unit disc must move about a fixed axis which is transverse of said valve disc center-line and eccentric to the valve seat, to provide for direct, non-dragging, engagement between the disc torus and valve seat as the C valve unit approaches its fully closed position, wherein the center-lines of the disc torus and valve seat coincide.

4. A railroad car angle cock, as defined in claim 3, wherein the C valve unit stud and shaft engage their respective bearing socket and bonnet bearing block in a loose fit, whereby air pressure built up behind the valve disc causes lateral shifting of the unit toward the valve seat, when the valve unit is in its closed position, to press the yieldable torus into firm sealing engagement with the valve seat.

No references cited.

WILLIAM F. O'DEA, *Primary Examiner.*

H. WEAKLEY, *Assistant Examiner.*